(12) United States Patent
Imanishi et al.

(10) Patent No.: US 9,085,319 B2
(45) Date of Patent: Jul. 21, 2015

(54) STEERING DEVICE FOR WHEEL LOADER

(75) Inventors: Kota Imanishi, Komatsu (JP); Hiroyuki Chikugo, Oyama (JP); Shuuji Hori, Oyama (JP); Mitsumasa Akashi, Oyama (JP); Akira Hasebe, Oyama (JP); Shuki Akushichi, Sagamihara (JP); Nobumasa Takamatsu, Komatsu (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 14/122,405

(22) PCT Filed: Apr. 19, 2012

(86) PCT No.: PCT/JP2012/060541
§ 371 (c)(1),
(2), (4) Date: Nov. 26, 2013

(87) PCT Pub. No.: WO2013/145334
PCT Pub. Date: Oct. 3, 2013

(65) Prior Publication Data
US 2014/0083792 A1    Mar. 27, 2014

(30) Foreign Application Priority Data
Mar. 29, 2012  (JP) ................................. 2012-076093

(51) Int. Cl.
*B62D 5/09*    (2006.01)
*B62D 5/07*    (2006.01)
(Continued)

(52) U.S. Cl.
CPC  *B62D 5/075* (2013.01); *B62D 1/22* (2013.01); *B62D 5/09* (2013.01); *B62D 5/28* (2013.01); *B62D 12/00* (2013.01); *E02F 9/0841* (2013.01); *E02F 9/225* (2013.01); *E02F 9/2296* (2013.01)

(58) Field of Classification Search
CPC ............ B62D 12/00; B62D 9/00; B62D 5/09; E02F 9/0841; E02F 9/225
USPC ......................................... 180/418, 419, 420
See application file for complete search history.

(56) References Cited

U.S. PATENT DOCUMENTS 7,610,989 B2 *  11/2009  Vigholm et al. ............... 180/418
7,624,836 B2 *  12/2009  Huang et al. ................... 180/423
(Continued)

FOREIGN PATENT DOCUMENTS

JP    2000-190858 A    7/2000
JP    2005-535487 A    11/2005
(Continued)

OTHER PUBLICATIONS

International Search Report for PCT/JP2012/060541, issued on Jul. 17, 2012.
(Continued)

*Primary Examiner* — Kevin Hurley
(74) *Attorney, Agent, or Firm* — Global IP Counselors, LLP

(57) ABSTRACT

A steering device for a wheel loader includes a rotatable handle, a tiltable lever, a steering cylinder, a steering valve, a pump, a handle control valve, a lever control valve, and a handle prioritization valve. The steering valve controls a supply direction of operating fluid to the steering cylinder with pilot hydraulic pressure. The pump supplies operating fluid to the steering cylinder via the steering valve. The handle and lever control valves supply pilot hydraulic pressure to control the supply direction to the steering valve according to handle rotation and lever tilt, respectively. The handle prioritization valve shuts off the pilot hydraulic pressure supplied from the lever control valve to the steering valve according to a differential pressure or an absolute pressure in a hydraulic circuit produced due to operating fluid flowing through the handle control valve when the handle is operated.

3 Claims, 13 Drawing Sheets

(51) Int. Cl.
*B62D 1/22* (2006.01)
*B62D 12/00* (2006.01)
*E02F 9/08* (2006.01)
*E02F 9/22* (2006.01)
*B62D 5/28* (2006.01)

(56) References Cited

U.S. PATENT DOCUMENTS

| | | | |
|---|---|---|---|
| 8,627,917 B2* | 1/2014 | Kodera et al. | 180/441 |
| 2005/0139412 A1* | 6/2005 | Vigholm | 180/418 |
| 2005/0146115 A1 | 7/2005 | Vigholm et al. | |
| 2008/0116000 A1* | 5/2008 | Huang et al. | 180/418 |
| 2010/0101888 A1 | 4/2010 | Nakamura et al. | |
| 2012/0118661 A1 | 5/2012 | Kodera et al. | |

FOREIGN PATENT DOCUMENTS

| | | |
|---|---|---|
| WO | 2008/090883 A1 | 7/2008 |
| WO | 2011/121886 A1 | 10/2011 |

OTHER PUBLICATIONS

Japanese Office Action, issued on Dec. 4, 2012 for the corresponding Japanese application No. 2012-523534.

* cited by examiner

STEERING DEVICE FOR WHEEL LOADER

CROSS-REFERENCE TO RELATED APPLICATIONS

This application is a U.S. National stage application of International Application No. PCT/JP2012/060541, filed on Apr. 19, 2012. This U.S. National stage application claims priority under 35 U.S.C. §119(a) to Japanese Patent Application No. 2012-076093, filed in Japan on Mar. 29, 2012, the entire contents of which are hereby incorporated herein by reference.

BACKGROUND

1. Field of the Invention

The present invention relates to a steering device and in particular to a steering device for a wheel loader in which a front frame and a rear frame are pivotably coupled in the horizontal direction.

2. Background Information

A wheel loader is provided with a handle for performing a steering operation when traveling at a high speed on a public road or at a work site. A lever such as a joystick is also provided to allow for effective steering with simple operations at a work site where steering operations for short distances are repeated.

There is a possibility that an unintentional steering operation may be performed when the driver mistakenly touches the lever while operating the handle on a wheel loader in which both handle and lever operations may be used for steering as described above.

Accordingly, a control device for a material handling machine described in Japanese Laid-open Patent Publication No. 2005-535487 is configured so that a handle operation is prioritized when the handle and the lever are operated at the same time. Specifically, the device described in Japanese Laid-open Patent Publication No. 2005-535487 is provided with a sequence valve along with a control valve for a lever operation. When the handle is operated, the sequence valve is actuated by operating fluid fed by a control valve for the handle operation, and the supply of the operating fluid from the control valve for the lever operation to a steering cylinder is blocked.

SUMMARY

The control device in Japanese Laid-open Patent Publication No. 2005-535487 is provided with two electromagnetic control valves and a sequence valve as means for prioritizing the handle operation, the valves being provided separately from the control valve for the handle operation and the control valve for the lever operation. Thus, the configuration for prioritizing the handle operation is complex.

Moreover, in the control device of Japanese Laid-open Patent Publication No. 2005-535487, the sequence valve and the electromagnetic control valves are actuated by operating fluid flowing through the valve for the handle operation and the pressure at both ends of the control valve for the lever operation is the same, and as a result the supply of operating fluid from the control valve for the lever operation to the steering cylinder is stopped.

However, with this type of configuration, the action of the sequence valve becomes unstable due to the amount of operating fluid flowing through the control valve for the handle operation, and the handle operation cannot be continuously and reliably prioritized.

An object of the present invention is to achieve a mechanism for prioritizing handle operations with a simple configuration and to actuate the mechanism in a stable manner in a wheel loader in which steering can be performed by a handle operation and a lever operation.

A steering device for a wheel loader according to a first aspect of the present invention includes a handle that is operated by rotating for steering, a lever that is operated by tilting for steering, a steering cylinder for pivoting a front frame in relation to a rear frame by expansion and contraction of the steering cylinder, a steering valve, a pump, a handle control valve, a lever electromagnetic control valve, and a handle prioritization valve. The steering valve uses pilot hydraulic pressure to control the supply direction of operating fluid to the steering cylinder. The pump supplies operating fluid to the steering cylinder via the steering valve. The handle control valve supplies pilot hydraulic pressure for controlling the supply direction to the steering valve according to a rotation operation of the handle. The lever control valve supplies pilot hydraulic pressure for controlling the supply direction to the steering valve according to a tilting operation of the lever. The handle prioritization valve shuts off the pilot hydraulic pressure supplied from the lever electromagnetic control valve to the steering valve according to a differential pressure or an absolute pressure in a hydraulic circuit produced due to the operating fluid flowing through the handle control valve when the handle is operated.

When the handle is operated in this device, the pilot hydraulic pressure for controlling the flow direction of the operating fluid is supplied to the steering valve via the handle control valve. Moreover, when the lever is operated, the pilot hydraulic pressure for controlling the flow direction of the operating fluid is supplied to the steering valve via the lever control valve. Since the operating fluid flows through the handle control valve when the handle is operated, the handle prioritization valve is actuated due to the differential pressure or absolute pressure in the hydraulic circuit through which the operating fluid flows. Due to the actuation of the handle prioritization valve, the pilot hydraulic pressure supplied from the lever electromagnetic control valve to the steering valve is shut off.

When the handle is operated, the pilot hydraulic pressure to be supplied from the lever electromagnetic control valve to the steering valve is shut off and the handle operation is prioritized even if the lever is operated while the handle is being operated. Therefore, an unintentional steering operation can be prevented even if the driver mistakenly touches the lever while the handle is being operated. Moreover, since the pilot hydraulic pressure from the lever electromagnetic control valve is shut off by the handle prioritization valve that is actuated due to the differential pressure or absolute pressure in the hydraulic circuit produced by the handle operation, the circuit configuration is simplified and unstable operation of the handle prioritization valve can be prevented.

In a steering device for a wheel loader according to a second aspect of the present invention, the handle prioritization valve in the device of the first aspect has a first throttle provided in a circuit for supplying operating fluid to the handle control valve, and a prioritization valve body. The prioritization valve body has a communication stage for supplying pilot hydraulic pressure from the lever electromagnetic control valve to the steering valve, and a shutoff stage for shutting off the supply of the pilot hydraulic pressure to the steering valve, and when a differential pressure is produced on either side of the first throttle, the communication stage is switched to the shutoff stage.

When the handle is operated in this device, the operating fluid flows to the handle control valve. A differential pressure is produced on either side of the first throttle due to the flow of the operating fluid. The prioritization valve body switches to the shutoff stage due to the differential pressure. As a result, the pilot hydraulic pressure supplied from the lever electromagnetic control valve to the steering valve is shut off.

Since the differential pressure is produced by the first throttle and the prioritization valve body is actuated, the handle operation can be prioritized in a stable manner with a simple mechanism.

In a steering device for a wheel loader according to a third aspect of the present invention, the handle prioritization valve of the device according to the second aspect further includes a second throttle that has a smaller aperture diameter than that of the first throttle and that is provided in a circuit for supplying operating fluid to the lever electromagnetic control valve.

The handle operation is preferably prioritized even when the prioritization valve body does not operate in a normal way.

The second throttle having a smaller aperture diameter than that of the first throttle on the handle control valve side is provided in the circuit for supplying operating fluid to the lever electromagnetic control valve.

Since the aperture diameter of the first throttle is relatively large and the aperture diameter of the second throttle is relatively small, more operating fluid is supplied to the handle control valve than to the lever electromagnetic control valve and the handle operation is prioritized even if the prioritization valve body does not operate in a normal way.

A steering device for a wheel loader according to a fourth aspect of the present invention further includes a check valve provided parallel to the first throttle in the device of the second or third aspect, the check valve being opened to supply operating fluid to the handle control valve when the differential pressure on either side of the first throttle is equal to or greater than a certain pressure, and stopping a reverse flow of operating fluid from the handle control valve.

The check valve is provided parallel to the first throttle. Therefore, the check valve opens when the differential pressure required for actuating the prioritization valve body is exceeded so that an increase in pressure loss during a large flow rate can be suppressed. Moreover, even if the first throttle is temporarily blocked, operating fluid can be supplied to the handle control valve via the check valve when the circuit pressure is equal to or greater than a certain pressure.

A steering device for a wheel loader according to a fifth aspect of the present invention further includes a left pilot oil passage and a right pilot oil passage provided between the handle control valve and the steering valve in the device of the first aspect. The handle prioritization valve includes a priority control valve and a switching valve. The priority control valve is disposed between the steering valve and the handle control valve and the lever electromagnetic control valve, and includes a handle stage that allows communication between the handle control valve and the steering valve and shuts off communication between the lever electromagnetic control valve and the steering valve, and a lever stage that shuts off communication between the handle control valve and the steering valve and allows communication between the lever electromagnetic control valve and the steering valve. The switching valve switches the priority control valve to the handle stage when a differential pressure is produced between the left pilot oil passage and the right pilot oil passage.

When the handle is operated in this device, the operating fluid flows to the handle control valve. As a result, a differential pressure is produced between the left pilot oil passage and the right pilot oil passage provided on the output side of the handle control valve. The priority control valve is switched to the handle stage by the switching valve when this differential pressure is produced.

In this case, the handle operation is accurately prioritized in a stable manner when the handle is operated.

A steering device for a wheel loader according to a sixth aspect of the present invention further includes a left lever pilot oil passage and a right lever pilot oil passage provided between the lever control valve and the priority control valve in the device of the fifth aspect. The switching valve switches the priority control valve to the lever stage when no differential pressure exists between the left pilot oil passage and the right pilot oil passage and when a differential pressure is produced between the left lever pilot oil passage and the right lever pilot oil passage.

When the handle is not operated in this device, the operating fluid does not flow to the handle control valve and no differential pressure is produced between the left and right pilot passages. Conversely, when the lever is operated, a differential pressure is produced between the left and right lever pilot passages. In this way, the priority control valve is switched to the lever stage by the switching valve when a differential pressure is produced between the left and right pilot passages on the lever side.

When a lever operation is performed in this case, a steering operation can be performed accurately with a lever operation.

A steering device for a wheel loader according to a seventh aspect of the present invention further includes a left pilot oil passage and a right pilot oil passage provided between the handle control valve and the steering valve in the device of the first aspect. The handle prioritization valve includes a priority control valve and a switching valve. The priority control valve is disposed between the steering valve and the handle control valve and the lever electromagnetic control valve, and includes a handle stage that allows communication between the handle control valve and the steering valve and shuts off communication between the lever electromagnetic control valve and the steering valve, and a lever stage that shuts off communication between the handle control valve and the steering valve and allows communication between the lever electromagnetic control valve and the steering valve. The switching valve switches the priority control valve to the handle stage when operating fluid flows to the handle control valve, and switches the priority control valve to the lever stage when operating fluid flows only to the lever electromagnetic control valve.

When the handle is operated in this device, the operating fluid flows through the handle control valve to the left pilot oil passage or the right pilot oil passage. The priority control valve is switched to the handle stage by the switching valve upon receiving the flow of the operating fluid. When only the lever is operated and the operating fluid flows only to the lever electromagnetic control valve, the priority control valve is switched to the lever stage by the switching valve.

Switching can be performed accurately and in a stable manner in accordance with the operations.

A steering device for a wheel loader according to an eighth aspect of the present invention further includes a left pilot oil passage and a right pilot oil passage provided between the handle control valve and the steering valve, and a return oil passage for guiding return oil from the steering valve to a tank via the handle control valve, in the device of the first aspect. Moreover, output ports of the lever electromagnetic control valve are connected to the left and right pilot oil passages. The handle prioritization valve further includes a throttle and a prioritization valve body. The throttle is provided between the handle control valve and the tank in the return oil passage. The prioritization valve body is provided between the output ports of the lever electromagnetic control valve and the left and right pilot oil passages, and includes a communication stage for allowing communication between the output ports of the lever electromagnetic control valve and the left and right pilot oil passages, and a shutoff stage for shutting off communication between the output ports of the lever electromagnetic control valve and the left and right pilot oil passages. The prioritization valve body is switched to the shutoff stage when a differential pressure is produced on either side of the throttle, and is switched to the communication stage when no differential pressure is produced on either side of the throttle.

When the handle is operated in this device, the operating fluid is returned from the steering valve to the tank via the handle control valve. Therefore, a differential pressure is produced on either side of the throttle provided in the return oil passage. In this case, the prioritization valve body is switched to the shutoff stage. Therefore, operating fluid from the lever electromagnetic control valve is not supplied to the steering valve. Specifically, the handle operation is prioritized. Moreover, when the handle is not operated and the lever is operated, no differential pressure is produced on either side of the throttle. In this case, the prioritization valve body is switched to the communication stage. Therefore, the operating fluid from the lever electromagnetic control valve is supplied to the left pilot oil passage or the right pilot oil passage via the steering valve and a steering operation using the lever is possible.

A steering device for a wheel loader according to a ninth aspect of the present invention further includes a check valve provided parallel to the throttle in the device of the eighth aspect, the check valve opening to return operating fluid to the tank when the differential pressure on either side of the throttle is equal to or greater than a certain pressure.

The check valve opens when the differential pressure required for actuating the prioritization valve body is exceeded so that an increase in pressure loss during a large flow rate can be suppressed. Moreover, operating fluid is returned from the handle control valve side to the tank side via the check valve when the throttle is clogged. As a result, disablement of a handle operation is prevented.

The wheel loader in which steering can be performed by a handle operation and a lever operation in the present invention as described above realizes a mechanism for prioritizing the handle operation with a simple configuration, and furthermore the prioritization of the handle operation can be actuated in a stable manner.

DETAILED DESCRIPTION OF EMBODIMENT(S)

First Embodiment (Overall Configuration of Wheel Loader)

Figure 1:
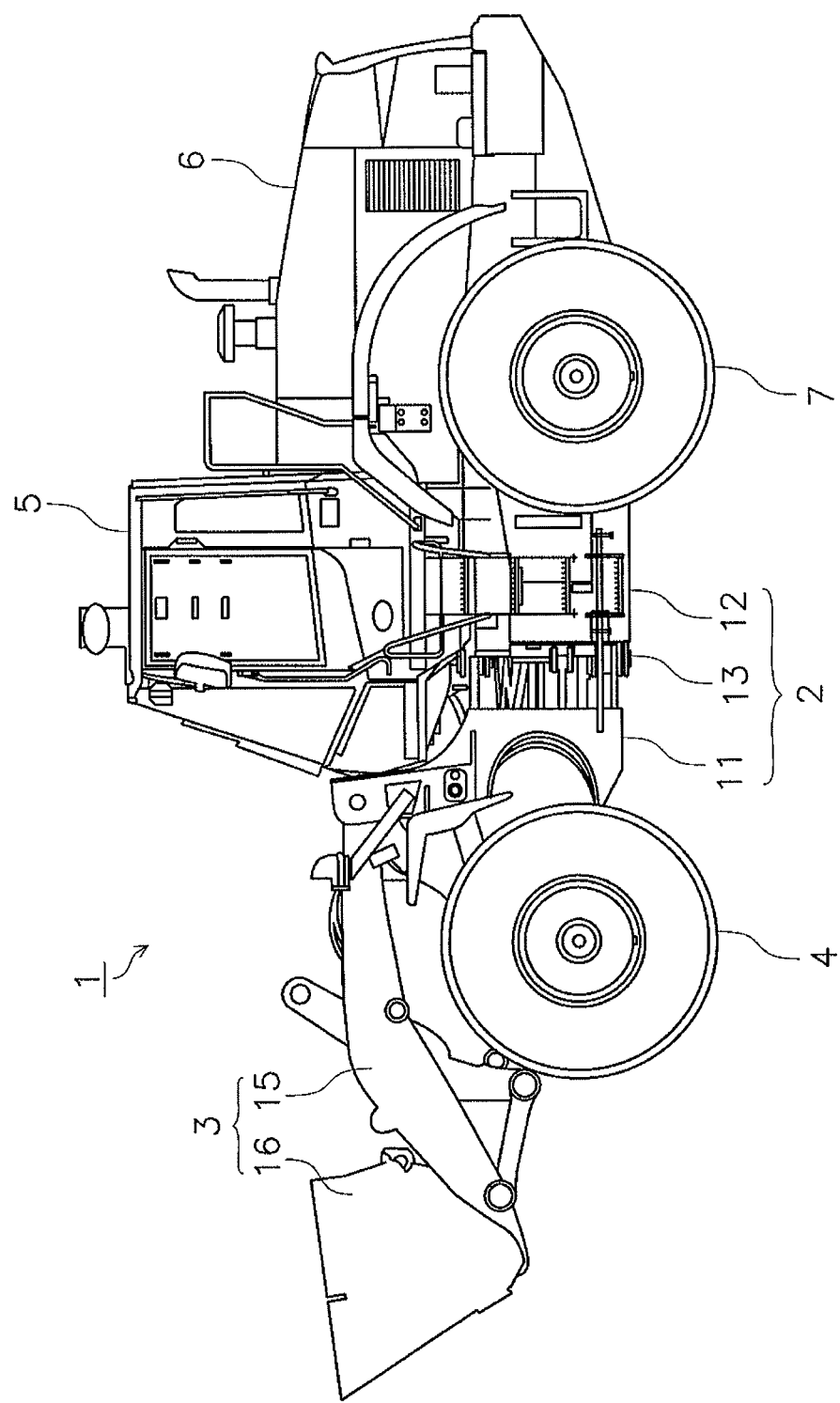
FIG. 1 is an external appearance of a wheel loader.

FIG. 1 illustrates an overall configuration of a wheel loader 1 on which is mounted a steering device according to the first embodiment of the present invention. FIG. 1 is a side view of the wheel loader 1.

The wheel loader 1 includes a vehicle frame 2, working equipment 3, a pair of front tires 4, an operating cabin, an engine room 6, and a pair of rear tires 7.

The vehicle frame 2 is a so-called articulated construction and includes a front frame 11, a rear frame 12, and a coupling part 13. The front frame 11 is disposed in front of the rear frame 12 and is coupled to the rear frame 12 by the coupling part 13 in a manner that allows pivoting in the left and right directions.

The working equipment 3 includes a lift arm 15 and a bucket 16. The lift arm 15 and the bucket 16 are driven by pressure oil supplied by a hydraulic pump which is not illustrated. A proximal end of the lift arm 15 is pivotably supported on the front frame 11. The bucket 16 is pivotably attached to a distal end part of the lift arm 15.

The operating cabin 5 is disposed on the rear frame 12. A handle and a joystick for performing steering operations, an operating member for operating the working equipment, and various display devices are disposed inside the operating cabin 5.

(Steering Device 20)

Figure 2:
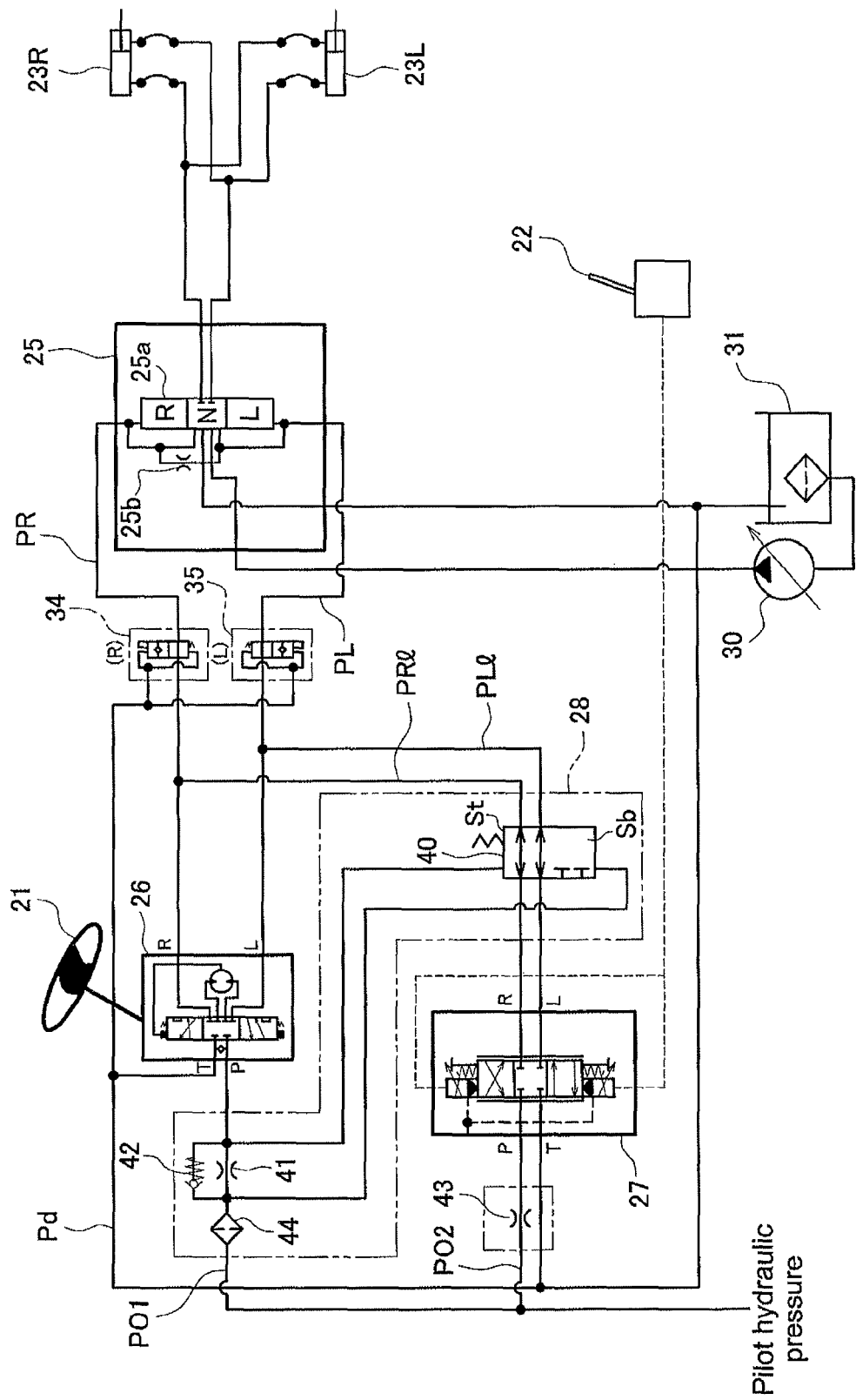
FIG. 2 illustrates a system configuration of a steering device according to a first embodiment of the present invention.

FIG. 2 illustrates a configuration of a steering device 20. The steering device 20 is a device for turning the vehicle by pivoting the front frame 11 with respect to the rear frame 12.

The steering device 20 includes a handle 21 that is rotated, a joystick 22 that is tilted, and left and right steering cylinders 23L and 23R. The handle 21 and the joystick 22 are members for steering. By operating the members 21 and 22, the left and right steering cylinders 23L and 23R extend and contract to allow the front frame 11 to pivot with respect to the rear frame 12.

The steering device 20 further includes a steering valve 25, an orbit roll 26 as a handle control valve, a lever electromagnetic control valve 27, and a handle prioritization valve 28.

(Steering Valve 25)

The steering valve 25 is a member for supplying operating fluid from a pump 30 to either of the left and right steering cylinders 23L and 23R in response to pilot hydraulic pressure from the orbit roll 26 or the lever electromagnetic control valve 27.

Specifically, a directional control valve 25a that configures the steering valve 25 is switched a left turning stage L when operating fluid is supplied to a left pilot port, and is switched to a right turning stage R when operating fluid is supplied to a right pilot port. When the directional control valve 25a is switched to the left turning stage L, operating fluid from the pump 30 is supplied to a bottom-side oil chamber of the left steering cylinder 23L and to a rod-side oil chamber of the right steering cylinder 23R, and the operating fluid inside the bottom-side oil chamber of the right steering cylinder 23R and inside the rod-side oil chamber of the left steering cylinder 23L is returned to a tank 31 via a drain oil passage Pd. Conversely, when the directional control valve 25a is switched to the right turning stage R, operating fluid from the pump 30 is supplied to a bottom-side oil chamber of the right steering cylinder 23R and to a rod-side oil chamber of the left steering cylinder 23L, and the operating fluid inside the bottom-side oil chamber of the left steering cylinder 23L and inside the rod-side oil chamber of the right steering cylinder 23R is returned to the tank 31 via the drain oil passage Pd. If operating fluid is not supplied to the left and right pilot ports, the directional control valve 25a is switched to a neutral stage N and the cylinders of the left and right steering cylinders 23L and 23R are shut off from the tank 31.

Both of the pilot ports of the directional control valve 25a communicate via a throttle 25b. If operating fluid is supplied to one of the pilot ports, operating fluid in the oil passage of the other pilot port side is returned to the tank 31 via the orbit roll 26 and the drain oil passage Pd.

While details are omitted, the steering valve 25 includes, in addition to the above directional control valve 25a, an unloading valve, a relief valve, and a safety valve and the like.

(Orbit Roll 26)

An input side P port of the orbit roll 26 is connected to a pump (not illustrated) for pilot hydraulic pressure, such as a fan pump, via a first input oil passage P01. The orbit roll 26 is a member for discharging operating fluid proportionate to a handle rotating amount from an L port when the handle 21 is rotated to the left and from an R port when the handle 21 is rotated to the right. A left pilot oil passage PL is connected to the output side of the L port, and a right pilot oil passage PR is connected to the output side of the R port.

The left pilot oil passage PL is connected to the left pilot port of the directional control valve 25a that configures the steering valve 25. The right pilot oil passage PR is connected to the right pilot port of the directional control valve 25a. Stop valves 34 and 35 are provided respectfully in the left and right pilot passages PL and PR. The stop valves 34 and 35 are members for forcefully stopping the supply of pilot hydraulic pressure to the steering valve 25.

A T port on the input side of the orbit roll 26 is connected to the tank 31 via the drain oil passage Pd. As described above, when operating fluid is supplied to either of the pilot ports of the directional control valve 25a, the passage on the other pilot port side is connected to the drain oil passage Pd via the T port.

(Lever Electromagnetic Control Valve 27)

A P port on the input side of the lever electromagnetic control valve 27 is connected, via a second input oil passage P02, to the pump connected to a first input oil passage P01.

The lever electromagnetic control valve 27 is a member for discharging operating fluid input from the P port to the L port or the R port on the output side in response to an operation of the joystick 22. A left lever pilot oil passage PL1 is connected to the L port, and the left lever pilot oil passage PL1 is connected to the left pilot oil passage PL. A right lever pilot oil passage PR1 is connected to the R port, and the right lever pilot oil passage PR1 is connected to the right pilot oil passage PR. The handle prioritization valve 28 is provided on the left lever pilot oil passage PL1 and the right lever pilot oil passage PR1.

As described above, operating fluid from the lever electromagnetic control valve 27 is supplied to the pilot ports of the steering valve 25 via the handle prioritization valve 28 and the left and right pilot oil passages PL and PR.

(Handle Prioritization Valve 28)

The handle prioritization valve 28 includes a prioritization valve body 40, a first throttle 41, a check valve 42, and a second throttle 43.

The prioritization valve body 40 is provided in the left and right lever pilot oil passages PL1 and PR1 on the output side of the lever electromagnetic control valve 27. The prioritization valve body 40 is switched between a communication stage St and a shutoff stage Sb due to pilot hydraulic pressure on either side of the first throttle 41. The first throttle 41 is provided in the first input oil passage P01. The check valve 42 is provided parallel to the first throttle 41 and supplies operating fluid from the first input oil passage P01 to the orbit roll 26 when the differential pressure on either side of the first throttle 41 is equal to or greater than a certain pressure. The second throttle 43 is provided in the second input oil passage P02 and is set so that the aperture diameter is less than that of the first throttle 41. A filter 44 is provided on the input side of the second throttle 43.

The prioritization valve body 40 is switched to the communication stage St by a spring when pilot hydraulic pressure does not act on the prioritization valve body 40. Conversely, the prioritization valve body 40 is switched to the shutoff stage Sb when operating fluid flows to the first throttle 41 and the hydraulic pressure on the input side of the first throttle 41 becomes higher than the output side of the first throttle 41.

(Steering Operation)

The following is an explanation of a steering device operation when turning to the left. An operation when turning to the right is basically the same except that the oil passages through which the pilot and steering operating fluids flow are different.

(Handle 21 Operation)

Figure 3:
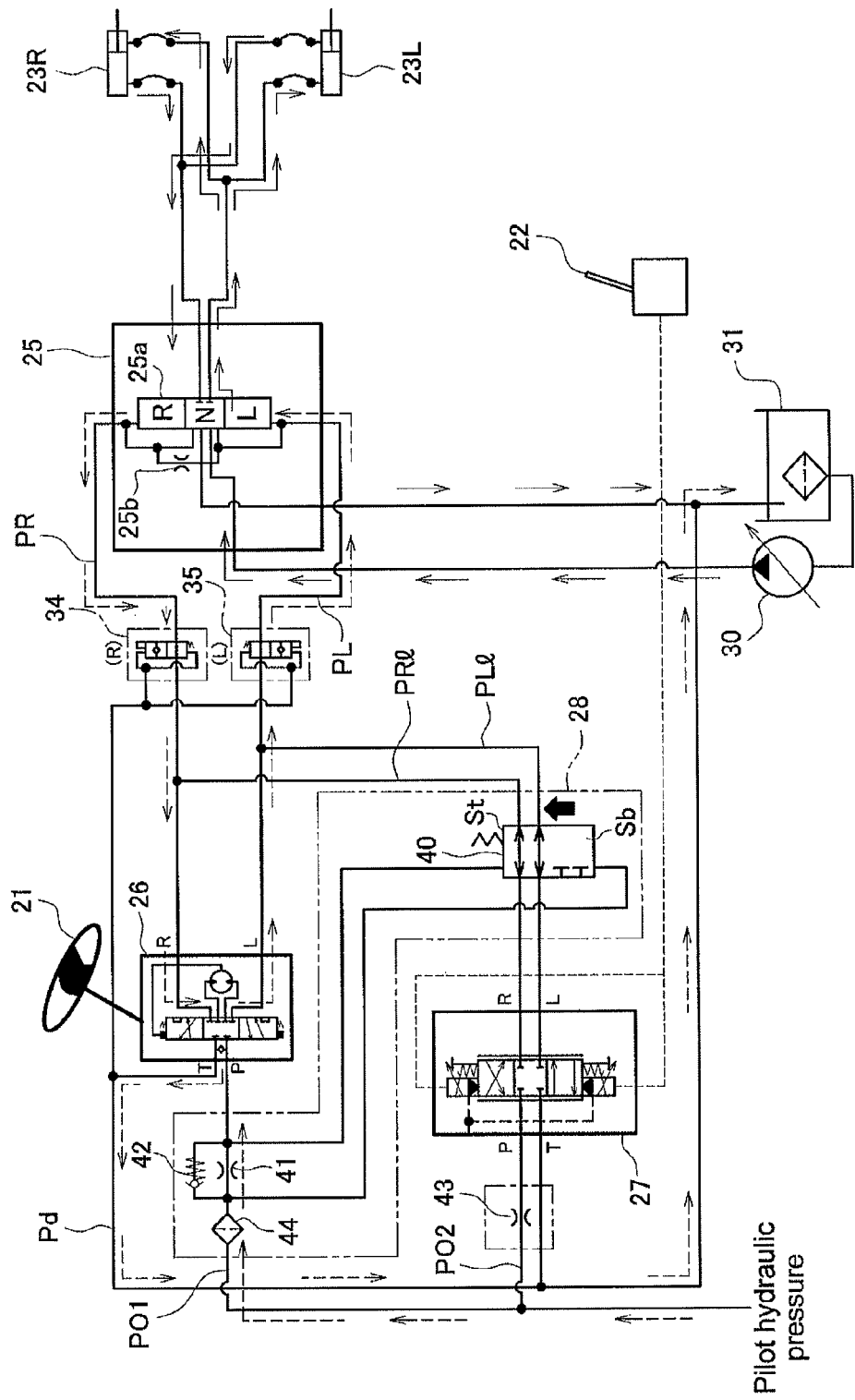
FIG. 3 describes a flow of operating fluid when a handle operation is conducted according to the first embodiment of the present invention.

FIG. 3 illustrates the flow of steering operating fluid (solid lines) and pilot operating fluid (dashed lines) when the handle is operated for a turn to the left.

When the handle 21 is operated, pilot operating fluid is input from the first input oil passage P01 to the orbit roll 26. Specifically, the operating fluid passes through the first throttle 41. As a result, the hydraulic pressure on the input side of the first throttle 41 is higher than the hydraulic pressure on the output side. As a result, the prioritization valve body 40 is switched to the shutoff stage Sb.

In the condition described above, the operating fluid input from the first input oil passage P01 is output from the orbit roll 26 to the left pilot oil passage PL. The operating fluid is input to the left pilot port of the directional control valve 25a of the steering valve 25 via the stop valve 35. The directional control valve 25a is switched to the left turning stage L due to the pilot hydraulic pressure.

At this time, the operating fluid in the right pilot oil passage PR that communicates with the right pilot port of the directional control valve 25a is returned to the tank 31 via the orbit roll 26 and the drain oil passage Pd.

When the directional control valve 25a of the steering valve 25 is switched to the left turning stage L, operating fluid from the pump 30 is supplied to the bottom-side oil chamber of the left steering cylinder 23L and to the rod-side oil chamber of the right steering cylinder 23R via the steering valve 25.

The operating fluid inside the bottom-side oil chamber of the right steering cylinder 23R and inside the rod-side oil chamber of the left steering cylinder 23L is returned to the tank 31 via the steering valve 25.

When the flow rate inside the first input oil passage P01 becomes large, the differential pressure on either side of the first throttle 41 is no longer greater than the required differential pressure and pressure loss increases. In this case, the check valve 42 opens and the differential pressure increases, that is, an increase in pressure loss is suppressed. The hydraulic pressure of the first input oil passage P01 increases when the first throttle 41 becomes clogged during a handle operation. When the hydraulic pressure equal or exceeds a certain hydraulic pressure, the check valve 42 opens and operating fluid is supplied to the orbit roll 26.

(Joystick 22 Operation)

Figure 4:
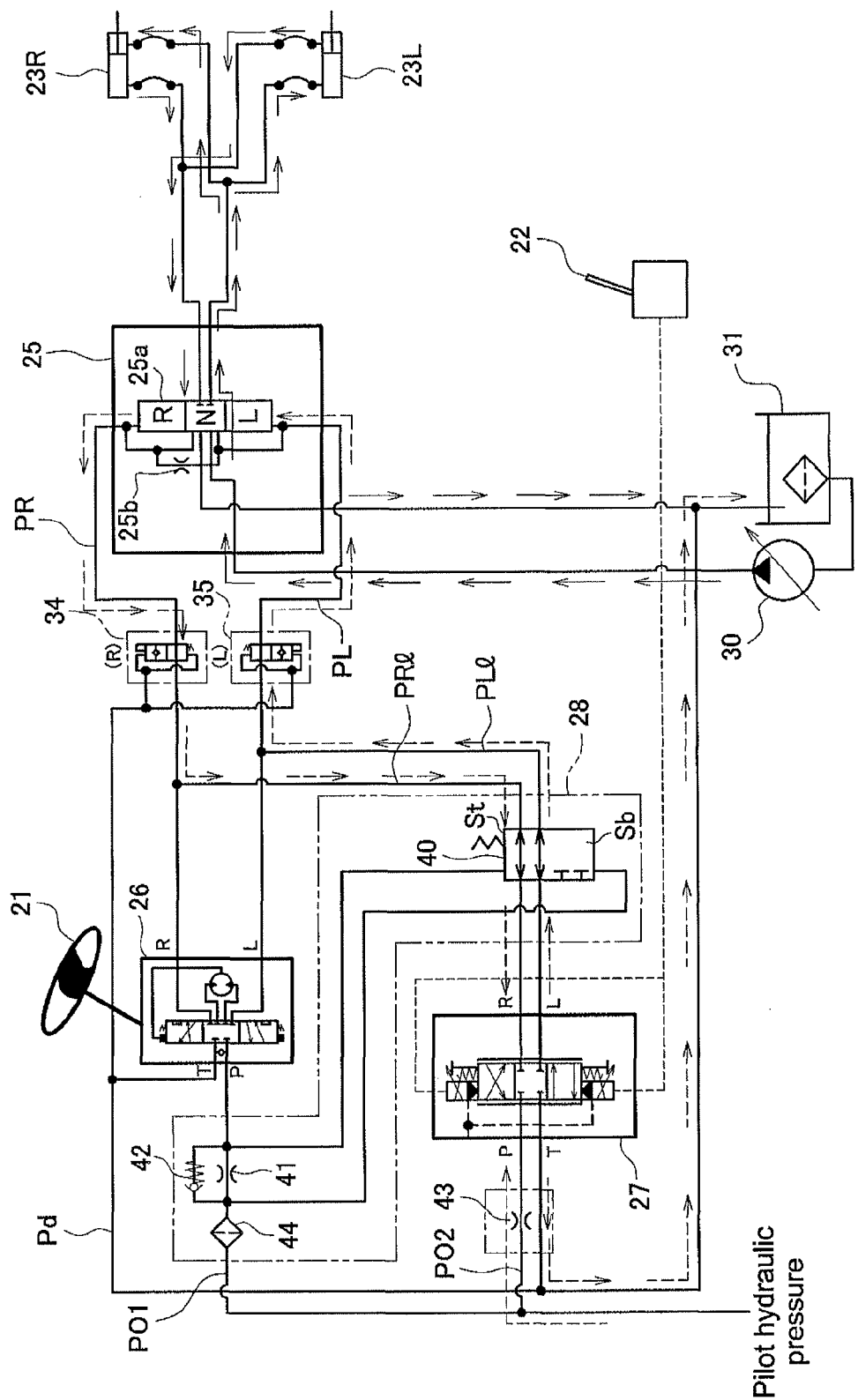
FIG. 4 describes a flow of operating fluid when a joystick operation is conducted according to the first embodiment of the present invention.

FIG. 4 illustrates a case in which only the joystick 22 is operated and the handle 21 is not operated. The flow of steering operating fluid is illustrated with solid lines, and the flow of the pilot operating fluid is illustrated with dashed lines in FIG. 4.

When the handle 21 is not operated, operating fluid does not flow to the first throttle 41. Therefore, no differential pressure is produced on either side of the first throttle 41. In this case, the prioritization valve body is switched to the communication stage St.

In the condition described above, operating fluid input from a second input oil passage P02 is output from the joystick 22 to the left lever pilot oil passage PL1. The operating fluid is supplied to the left pilot oil passage PL and, in the same way as described above for the handle operation, is input to the left pilot port of the directional control valve 25a of the steering valve 25. Therefore, the directional control valve 25a is switched to the left turning stage L. The pilot oil in the right pilot oil passage PR is returned from the tank port T of the lever electromagnetic control valve 27 to the tank 31 via the drain oil passage Pd.

The flow of the steering operating fluid is exactly the same as for the handle operation.

(When the Handle 21 and the Joystick 22 are Operated)

The joystick 22 may be operated when the operator mistakenly touches the joystick 22 while operating the handle 21. In this case, the handle operation is prioritized.

Specifically, when the handle 21 is operated, a differential pressure is produced on either side of the first throttle 41 and the prioritization valve body 40 is switched to the shutoff stage Sb as described above (see FIG. 3). Therefore, even if the joystick 22 is operated during the above condition, the operating fluid from the lever electromagnetic control valve 27 is shut off by the prioritization valve body 40.

(If Prioritization Valve Body 40 is Faulty)

If the prioritization valve body 40 has a fault, the prioritization valve body 40 may be switched to the shutoff stage Sb even when the handle 21 is being operated.

Operating fluid is supplied to both the orbit roll 26 and the lever electromagnetic control valve 27 under such a state. However, since the aperture diameter of the first throttle 41 is greater than that of the second throttle 43, the maximum flow rate to the P port of the orbit roll 26 is greater than the maximum flow rate to the P port of the lever electromagnetic control valve 27. As a result, the operation of the handle 21 is prioritized.

(Operation of Stop Valves 34, 35)

The stop valve 35 is mechanically shifted to a stage having a check valve when the wheel loader 1 is pivoted to the maximum limit for turning left. As a result, operating fluid from the orbit roll 26 is not supplied to the directional control valve 25a. Conversely, the left and right pilot passages PL and PR both become "0" since the operating fluid inside the right pilot oil passage is returned to the tank 31. As a result, the wheel loader 1 is able to maintain being steered to the left at the maximum limit. Steering to the right includes the above actions in reverse.

Effects of First Embodiment

Handle operations are prioritized when the handle 21 is operated. Therefore, an unintentional steering operation can be prevented even if the operator mistakenly touches the joystick 22 while the handle is being operated.

(2) The circuit configuration is simple and operations are conducted in a stable manner since the prioritization valve body 40 is switched to the shutoff stage Sb due to a differential pressure on either side of the first throttle 41 produced due to a handle operation.

(3) The aperture diameter of the first throttle 41 on the handle operation side is set to be greater than the aperture diameter of the second throttle 43 on the joystick operation side. Therefore, even if the prioritization valve body 40 does not operate normally, more operating fluid is supplied to the orbit roll 26 and the handle operation is prioritized.

(4) The check valve 42 is provided parallel to the first throttle 41 and operating fluid is supplied to the orbit roll 26 via the check valve 42 when the differential pressure on either side of the first throttle 41 equals or exceeds a certain pressure. Therefore, even if a large amount of operating fluid is supplied to the first throttle 41, an increase in pressure loss is suppressed since the operating fluid flows via the check valve 42. Moreover, handle operations can still be effective even if the first throttle 41 is clogged.

Second Embodiment

Figure 5:
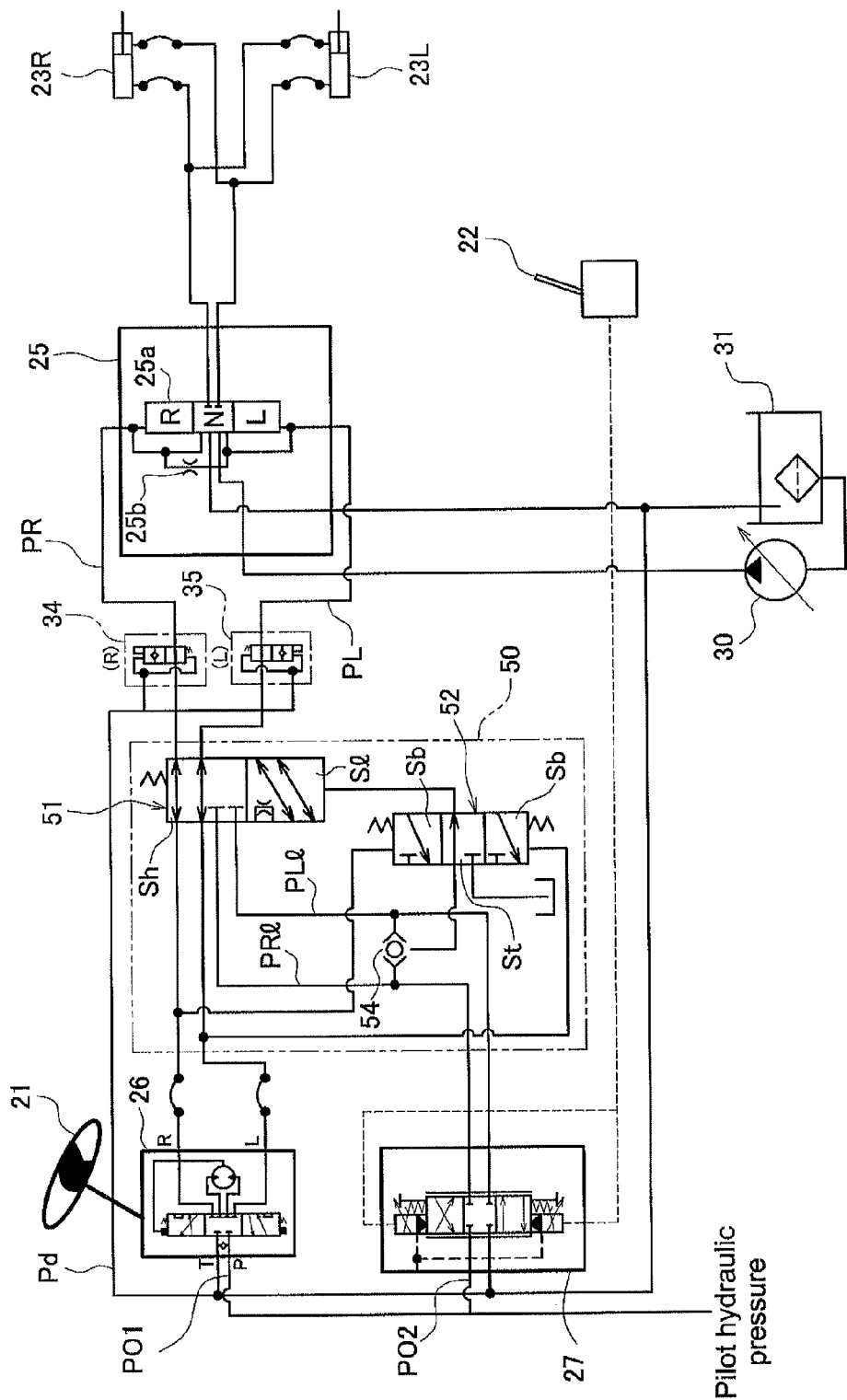
FIG. 5 illustrates a system configuration of a steering device according to a second embodiment of the present invention.

FIG. 5 illustrates a steering device according to a second embodiment of the present invention. Only a handle prioritization valve 50 in the steering device is different from the first embodiment and other configurations are the same as those in the first embodiment. The following is an explanation of the handle prioritization valve 50 that is different from the first embodiment.

(Handle Prioritization Valve 50)

The handle prioritization valve 50 includes a priority control valve 51 provided in the left and right pilot oil passages PL and PR, and a switching valve 52 for switching the priority control valve 51.

(Priority Control Valve 51)

The left and right output ports of the orbit roll 26 are connected to input ports of the priority control valve 51 via the left and right pilot oil passages PL and PR. The left and right output ports of the lever electromagnetic control valve 27 are connected to other input ports of the priority control valve 51. The input ports of the priority control valve 51 and the left and right output ports of the lever electromagnetic control valve 27 are connected by the left lever pilot oil passage PL1 and the right lever pilot oil passage PR1. The priority control valve 51 is able to switch between a handle stage Sh and a lever stage S1 based on pilot hydraulic pressure from the switching valve 52. Specifically, the priority control valve is switched to the handle stage Sh when pilot hydraulic pressure is not supplied, and switched to the lever stage S1 when pilot hydraulic pressure is supplied from the switching valve 52.

The handle stage Sh allows communication between the orbit roll 26 and the steering valve 25 and shuts off communication between the lever electromagnetic control valve 27 and the steering valve 25. The handle stage S1 shuts off communication between the orbit roll 26 and the steering valve 25 and allows communication between the lever electromagnetic control valve 27 from the steering valve 25.

(Switching Valve 52)

The switching valve 52 is a valve for switching the priority control valve 51 between the handle stage Sh and the lever stage S1. The hydraulic pressure from left and right pilot oil passages PL and PR is input to the pilot port of the switching valve 52. The switching valve 52 is switched to the shutoff stage Sb when a differential pressure between the left and right pilot oil passages PL and PR occurs, and is switched to the communication stage St when the pressure in both oil passages PL and PR is the same.

The left and right pilot oil passages PL1 and PR1 for the lever are connected to the input ports of the switching valve 52 via a shuttle valve 54. The output ports of the switching valve 52 are connected to the pilot ports of the priority control valve 51.

(Steering Operation)

The following is an explanation of a steering device operations when turning to the left in the same way as the first embodiment.

(Handle 21 Operation)

Figure 6:
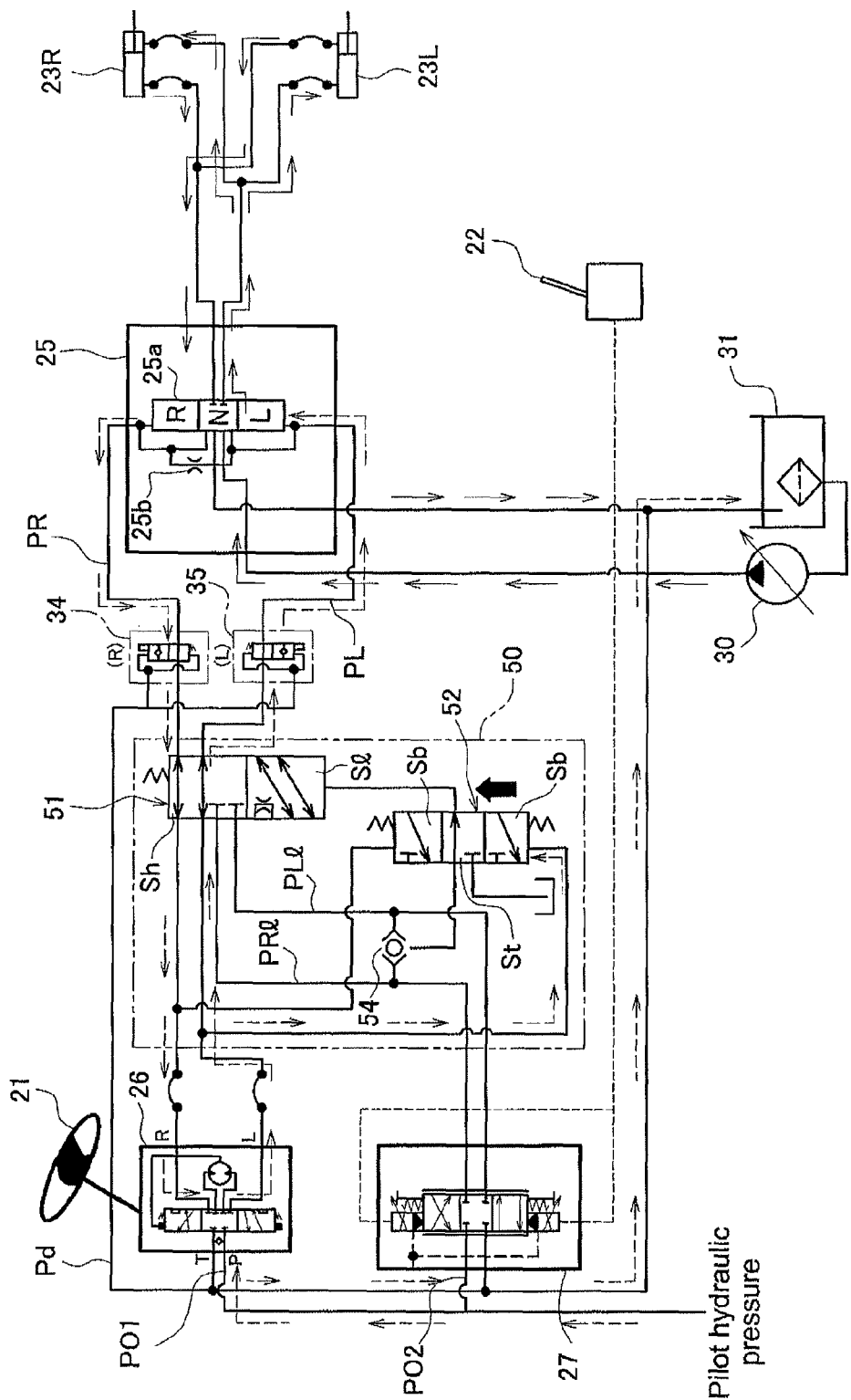
FIG. 6 describes a flow of operating fluid when a handle operation is conducted according to the second embodiment of the present invention.

FIG. 6 illustrates the flow of steering operating fluid (solid lines) and pilot operating fluid (dashed lines) when the handle is operated for a turn to the left.

When the handle 21 is operated, operating fluid is input from the first input oil passage P01 to the orbit roll 26. The operating fluid is output from the L port of the orbit roll 26 but operating fluid is not output from the R port. The R port is connected to the tank 31 via the T port. Therefore, while a certain pilot hydraulic pressure is produced in the left pilot oil passage PL, the hydraulic pressure in the right pilot oil passage PR is substantially "0". In this case, the switching valve 52 is switched to the shutoff stage Sb.

When the switching valve 52 is switched to the shutoff stage Sb, pilot hydraulic pressure is not supplied to the priority control valve 51. As a result, the priority control valve 51 is switched to the handle stage Sh.

In the condition described above, the operating fluid input from the first input oil passage P01 is output from the orbit roll 26 to the left pilot oil passage PL. The operating fluid is input to the left pilot port of the directional control valve 25a of the steering valve 25 via the stop valve 35. The directional control valve 25a is switched to the left turning stage L due to the pilot hydraulic pressure.

At this time, the operating fluid in the right pilot oil passage PR is returned from the tank port T of the orbit roll 26 to the tank 31 via the drain oil passage Pd.

When the directional control valve 25a of the steering valve 25 is switched to the left turning stage L, operating fluid from the pump 30 is supplied to the bottom-side oil chamber of the left steering cylinder 23L and to the rod-side oil chamber of the right steering cylinder 23R via the steering valve 25.

The operating fluid inside the bottom-side oil chamber of the right steering cylinder 23R and inside the rod-side oil chamber of the left steering cylinder 23L is returned to the tank 31 via the steering valve 25.

(Joystick 22 Operation)

Figure 7:
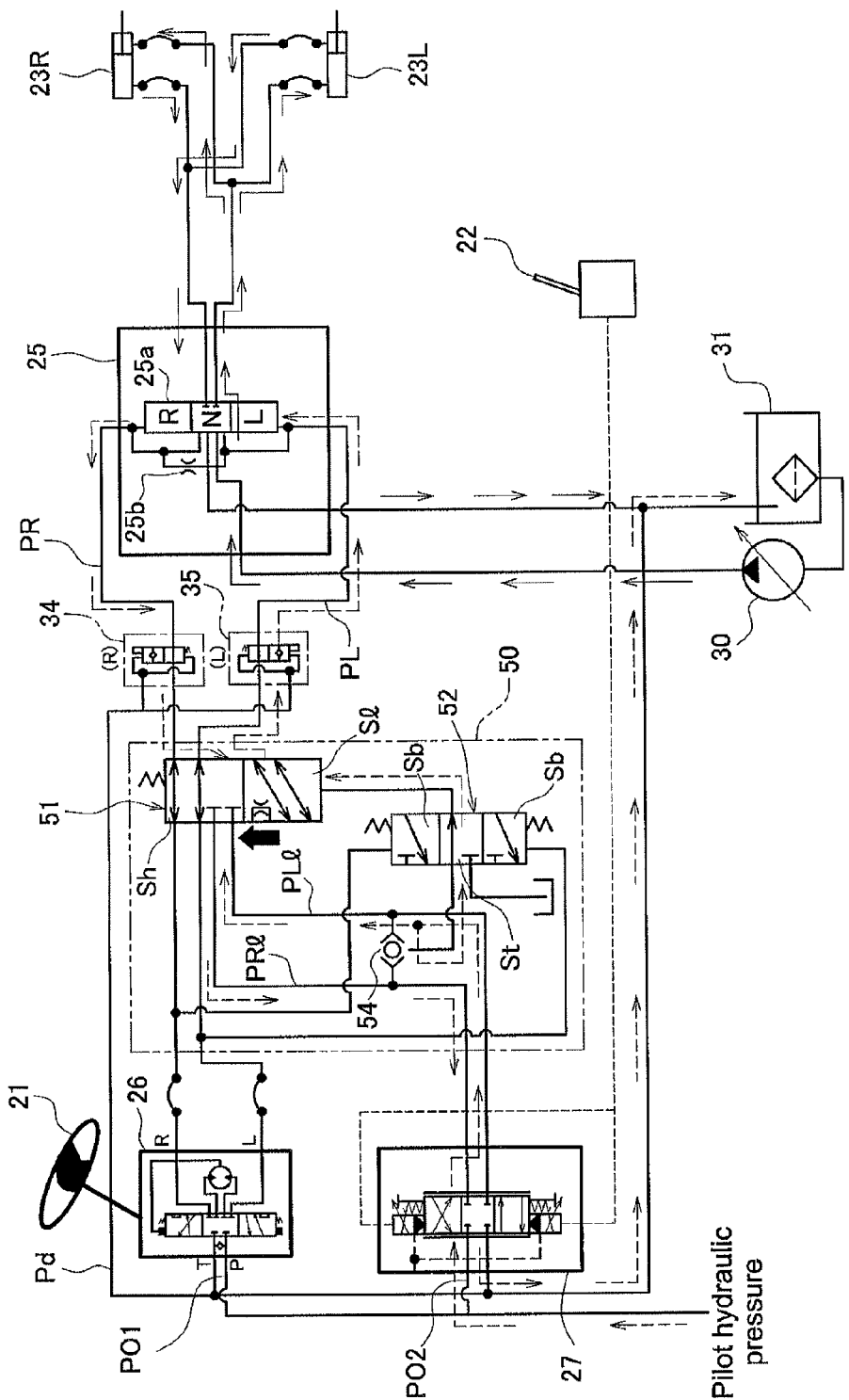
FIG. 7 describes a flow of operating fluid when a joystick operation is conducted according to the second embodiment of the present invention.

FIG. 7 illustrates a case in which only the joystick 22 is operated. When the handle 21 is not operated, operating fluid does not flow between the orbit roll 26 and the priority control valve 51 in the left and right pilot oil passages PL and PR. Therefore, no pressure difference is produced between the pilot oil passages PL and PR. In this case, the switching valve 62 is switched to the communication stage St.

When the joystick 22 is operated, operating fluid is input into the switching valve 52 via the shuttle valve 54 since the operating fluid is flowing in the left lever pilot oil passage PL1. Since the switching valve 52 is switched to the communication stage St, the input operating fluid is input into the pilot ports of the priority control valve 51. As a result, the priority control valve 51 is switched to the lever stage S1.

In the condition described above, operating fluid input from the second input oil passage P02 is output from the joystick 22 to the left lever pilot oil passage PL1. The operating fluid is supplied to the left pilot oil passage PL via the priority control valve 51 and, in the same way as described above for the handle operation, is input to the left pilot port of the directional control valve 25a of the steering valve 25. Therefore, the directional control valve 25a is switched to the left turning stage L. The operating fluid in the right pilot oil passage PR flows to the drain oil passage Pd via the priority control valve 51 and the lever electromagnetic control valve 27 and is returned to the tank 31.

The flow of the steering operating fluid is exactly the same as for the handle operation.

(When the Handle 21 and the Joystick 22 are Operated)

The joystick 22 may be operated when the operator mistakenly touches the joystick 22 while operating the handle 21. In this case, the handle operation is prioritized.

Specifically, when the handle 21 is operated, a differential pressure is produced between the left and right pilot oil passages PL and PR as described above. In this case, the switching valve 52 is switched to the shutoff stage Sb as illustrated in FIG. 6. Therefore, the operating fluid from the lever electromagnetic control valve 27 is shut off by the switching valve 52 and pilot hydraulic pressure is not supplied to the priority control valve 51. As a result, the priority control valve 51 is switched to the handle stage Sh in the same way as when the handle is operated.

As described above, a handle operation is prioritized by shutting off the operating fluid flowing from the lever electromagnetic control valve 27 with the priority control valve 51 even if the joystick 22 is operated during a handle operation.

Effects of Second Embodiment (1) Handle operations are prioritized when the handle 21 is operated. Therefore, an unintentional steering operation can be prevented even if the operator mistakenly touches the joystick 22 during a handle operation.

(2) The switching valve 52 is controlled by differential pressure between the left and right pilot oil passages PL and PR produced by a handle operation, and as a result the priority control valve 51 is switched to the handle stage Sh. Therefore, operations can be performed in a stable manner with a simple circuit configuration.

Third Embodiment

Figure 8:
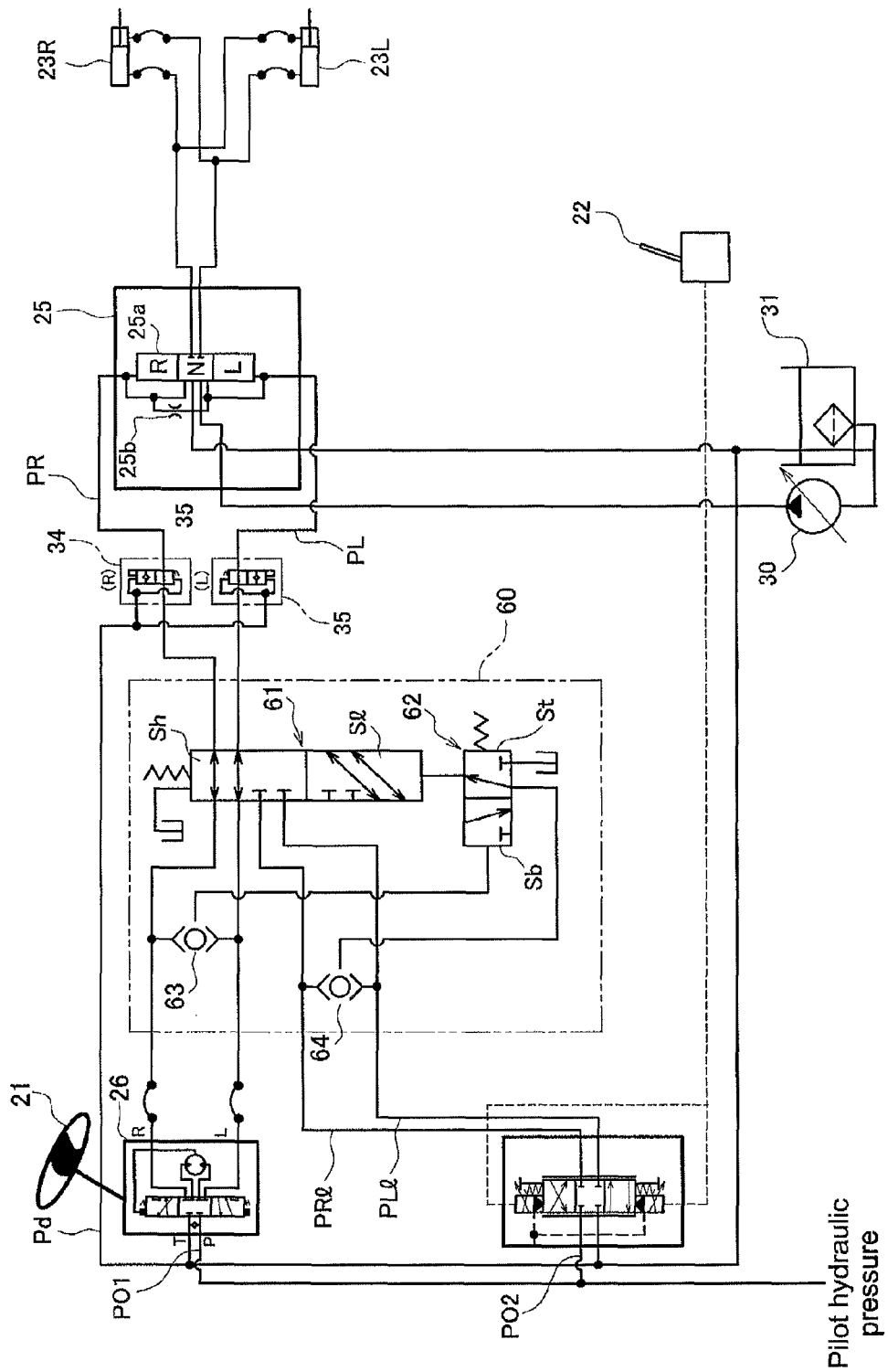
FIG. 8 illustrates a system configuration of a steering device according to a third embodiment of the present invention.

FIG. 8 illustrates a steering device according to a third embodiment of the present invention. Only a handle prioritization valve 60 in the steering device is different from the first and second embodiments and other configurations are the same as those in the other embodiments. The following is an explanation of the handle prioritization valve 60 that is different from the first embodiment.

(Handle Prioritization Valve 60)

The handle prioritization valve 60 includes a priority control valve 61 provided in the left and right pilot oil passages PL and PR, and a switching valve 62 for switching the priority control valve 61.

(Priority Control Valve 61)

The left and right output ports of the orbit roll 26 are connected to input ports of the priority control valve 61 via the left and right pilot oil passages PL and PR. The left and right output ports of the lever electromagnetic control valve 27 are connected to other input ports of the priority control valve 61. The input ports of the priority control valve 61 and the left and right output ports of the lever electromagnetic control valve 27 are connected to each other by the left lever pilot oil passage PL1 and the right lever pilot oil passage PR1. The priority control valve 61 is able to switch between the handle stage Sh and the lever stage S1 based on pilot hydraulic pressure from the switching valve 62. Specifically, the priority control valve is switched to the handle stage Sh when pilot hydraulic pressure is not supplied, and switched to the lever stage S1 when pilot hydraulic pressure is supplied from the switching valve 52.

The handle stage Sh allows communication between the orbit roll 26 and the steering valve 25 and shuts off communication between the lever electromagnetic control valve 27 and the steering valve 25. The handle stage S1 shuts off communication between the orbit roll 26 and the steering valve 25 and allows communication between the lever electromagnetic control valve 27 from the steering valve 25.

(Switching Valve 62)

The switching valve 62 is a valve for switching the priority control valve 61 between the handle stage Sh and the lever stage S1. The left and right pilot oil passages PL and PR are connected to the pilot ports of the switching valve 62 via a shuttle valve 63. The left and right lever pilot oil passages PL1 and PR1 are connected to the input ports of the switching valve 62 via a shuttle valve 64. The output ports of the switching valve 62 are connected to the pilot ports of the priority control valve 61.

When operating fluid flows in either of the left and right pilot oil passages PL and PR, pilot hydraulic pressure is input into the pilot ports of the switching valve 62 via the shuttle valve 63. In this case, the switching valve 62 is switched to the shutoff stage Sb. When operating fluid is not flowing in the left and right pilot oil passages PL and PR, the switching valve 62 is switched to the communication stage St.

(Steering Operation)

The following is an explanation of a steering device operation when turning to the left in the same way as the first embodiment.

(Handle 21 Operation)

Figure 9:
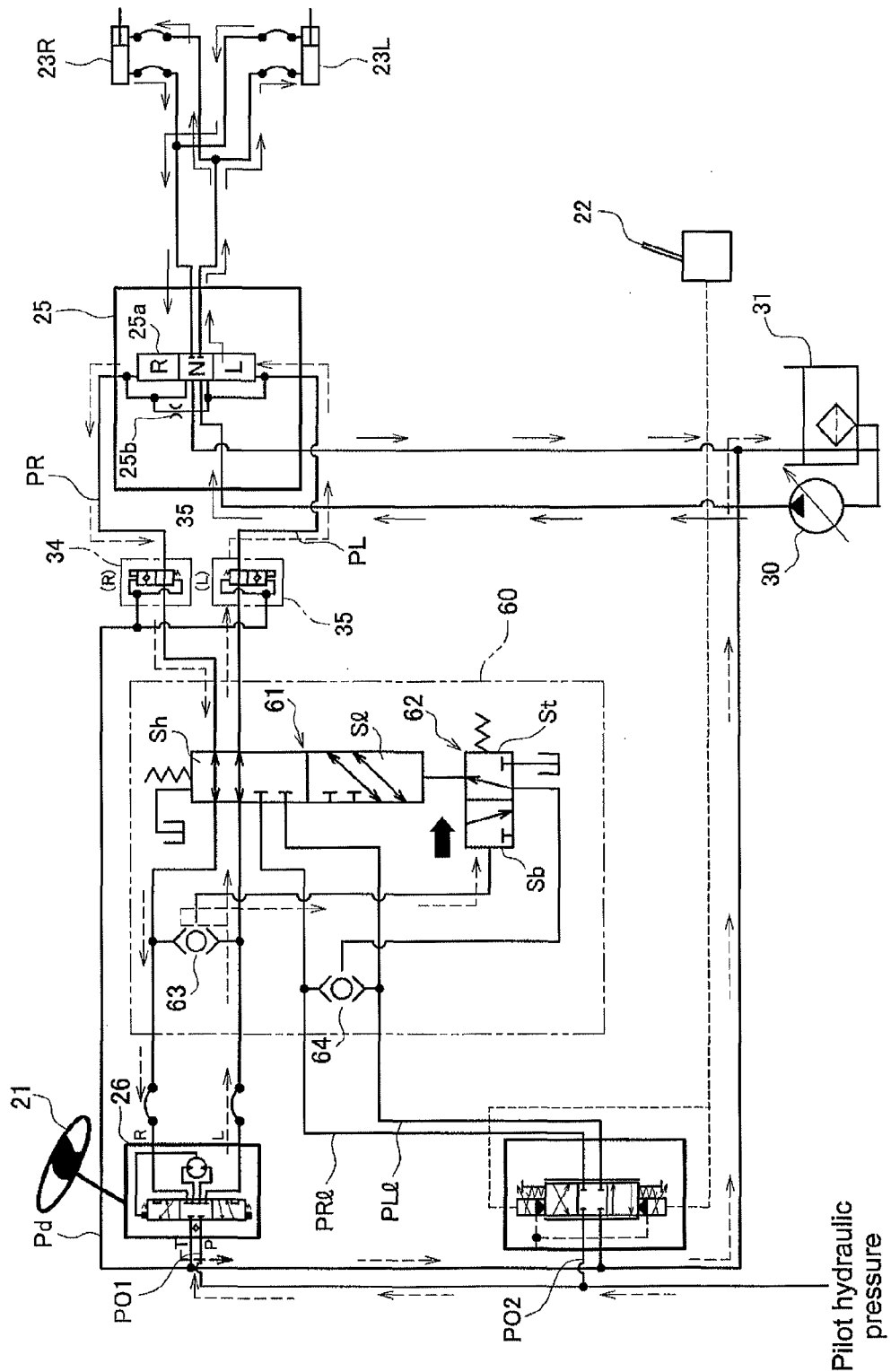
FIG. 9 describes a flow of operating fluid when a handle operation is conducted according to the third embodiment of the present invention.

FIG. 9 illustrates the flow of steering operating fluid (solid lines) and pilot operating fluid (dashed lines) when the handle is operated for a turn to the left.

When the handle 21 is operated, operating fluid is input from the first input oil passage P01 to the orbit roll 26. The operating fluid is input into the pilot ports of the switching valve 62 via the shuttle valve 63. Therefore, the switching valve 62 is switched to the shutoff stage Sb. When the switching valve 62 is switched to the shutoff stage Sb, pilot hydraulic pressure is not supplied to the priority control valve 61. Therefore, the priority control valve 61 is switched to the handle stage Sh.

In the condition described above, the operating fluid input from the first input oil passage P01 is output from the orbit roll 26 to the left pilot oil passage PL. The operating fluid is input to the left pilot port of the directional control valve 25a of the steering valve 25 via the stop valve 35. The directional control valve 25a is switched to the left turning stage L due to the pilot hydraulic pressure.

At this time, the operating fluid in the right pilot oil passage PR is returned from the tank port T of the orbit roll 26 to the tank 31 via the drain oil passage Pd.

When the directional control valve 25a of the steering valve 25 is switched to the left turning stage L, operating fluid from the pump 30 is supplied to the bottom-side oil chamber of the left steering cylinder 23L and to the rod-side oil chamber of the right steering cylinder 23R via the steering valve 25.

The operating fluid inside the bottom-side oil chamber of the right steering cylinder 23R and inside the rod-side oil chamber of the left steering cylinder 23L is returned to the tank 31 via the steering valve 25.

(Joystick 22 Operation)

Figure 10:
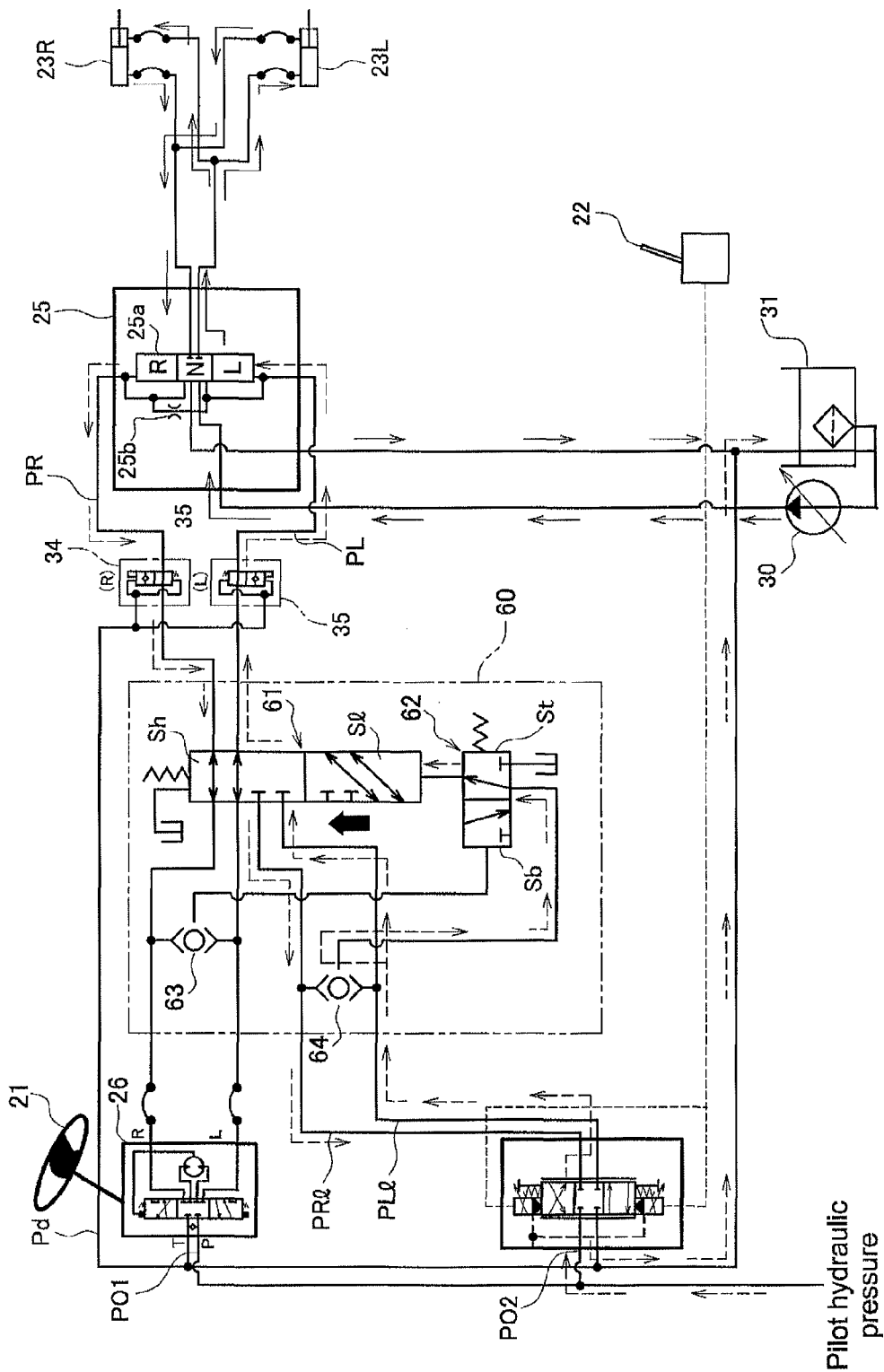
FIG. 10 describes a flow of operating fluid when a joystick operation is conducted according to the third embodiment of the present invention.

FIG. 10 illustrates a case in which only the joystick 22 is operated. When the handle 21 is not operated, operating fluid does not flow between the orbit roll 26 and the priority control valve 61 in the left and right pilot oil passages PL and PR. Therefore, pilot hydraulic pressure is not supplied to the pilot ports of the switching valve 62. In this case, the switching valve 62 is switched to the communication stage St.

When the joystick 22 is operated, operating fluid is input into the switching valve 62 via the shuttle valve 64 since the operating fluid is flowing in the left lever pilot oil passage PL1. Since the switching valve 62 is switched to the communication stage St, the input operating fluid is input into the pilot ports of the priority control valve 61. As a result, the priority control valve 61 is switched to the lever stage S1.

In the condition described above, operating fluid input from the second input oil passage P02 is output from the joystick 22 to the left lever pilot oil passage PL1. The operating fluid is supplied to the left pilot oil passage PL via the priority control valve 61 and, in the same way as described above for the handle operation, is input to the left pilot port of the directional control valve 25a of the steering valve 25. Therefore, the directional control valve 25a is switched to the left turning stage L. The pilot oil in the right pilot oil passage PR is returned from the tank port T of the lever electromagnetic control valve 27 to the tank 31 via the drain oil passage Pd.

The flow of the steering operating fluid is exactly the same as for the handle operation.

(When the Handle 21 and the Joystick 22 are Operated)

The joystick 22 may be operated when the operator mistakenly touches the joystick 22 while operating the handle 21. In this case, the handle operation is prioritized.

Specifically, when the handle 21 is operated, operating fluid flows in the left and right pilot oil passages PL and PR as described above. In this case, the switching valve 62 is switched to the shutoff stage Sb as illustrated in FIG. 9. Therefore, operating fluid from the lever electromagnetic control valve 27 is shut off by the switching valve 62 and pilot hydraulic pressure is not supplied to the priority control valve 61. As a result, the priority control valve 61 is switched to the handle stage Sh in the same way as when the handle is operated.

As described above, a handle operation is prioritized by shutting off the operating fluid flowing from the lever electromagnetic control valve 27 with the priority control valve 61 even if the joystick 22 is operated during a handle operation.

Effects of Third Embodiment

The effects of the third embodiment are the same as those of the second embodiment.

Fourth Embodiment

Figure 11:
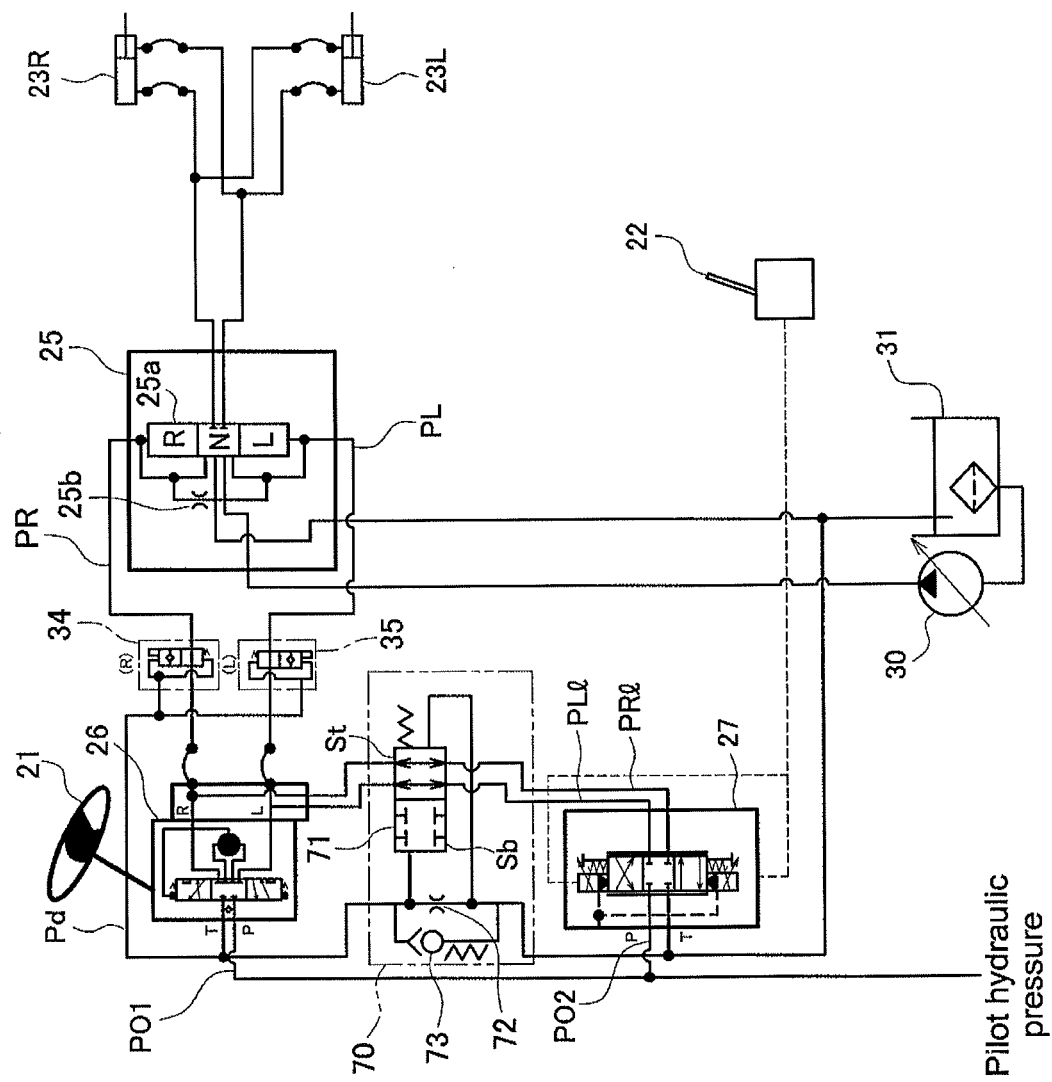
FIG. 11 illustrates a system configuration of a steering device according to a fourth embodiment of the present invention.

FIG. 11 illustrates a steering device according to a fourth embodiment of the present invention. Only a handle prioritization valve 70 in the steering device is different from the first to third embodiments and other configurations are the same as those in the other embodiments. The following is an explanation of the handle prioritization valve 70 that is different from that of the first embodiment.

(Handle Prioritization Valve 70)

The handle prioritization valve 70 includes a prioritization valve body 71, a throttle 72, and a check valve 73.

(Prioritization Valve Body 71)

The prioritization valve body 71 is provided in the left and right lever pilot oil passages PL1 and PR1 on the output side of the lever electromagnetic control valve 27. More specifically, the left lever pilot oil passage PL1 and the right lever pilot oil passage PR1 are connected to the output ports of the lever electromagnetic control valve 27. The left lever pilot oil passage PL1 is connected to the left pilot oil passage PL, and the right lever pilot oil passage PR1 is connected to the right pilot oil passage PR. The prioritization valve body 71 is provided in the left and right lever pilot oil passages PL1 and PR1.

The prioritization valve body 71 is controlled by pilot hydraulic pressure and is switched between the communication stage St and the shutoff stage Sb. The output ports of the lever electromagnetic control valve 27 are connected to the left and right pilot oil passages PL and PR via the left and right lever pilot oil passages PL1 and PR1 in the communication stage St. The left and right pilot oil passages PL and PR are shut off from the output ports of the lever electromagnetic control valve 27 in the shutoff stage Sb.

(Throttle 72)

The throttle 72 is provided in the drain oil passage Pd. The drain oil passage Pd is an oil passage that connects the T ports for draining on each valve and the tank 31 as described above. The throttle 72 is provided in the drain oil passage Pd between the T port for draining the orbit roll 26 and the T port for draining the lever electromagnetic control valve 27.

The oil passages on either side of the throttle 72 are connected to the pilot ports of the prioritization valve body 71. When the hydraulic pressure on the orbit roll 26 side of the throttle 72 is high, the prioritization valve body 71 is switched to the shutoff stage Sb.

(Check Valve 73)

The check valve 73 is provided parallel to the throttle 72. The check valve 73 opens when a differential pressure on either side of the throttle 72 is equal to or greater than a certain pressure and guides the upstream operating fluid to the tank 31.

(Steering Operation)

The following is an explanation of a steering device operation when turning to the left in the same way as the first embodiment.

(Handle 21 Operation)

Figure 12:
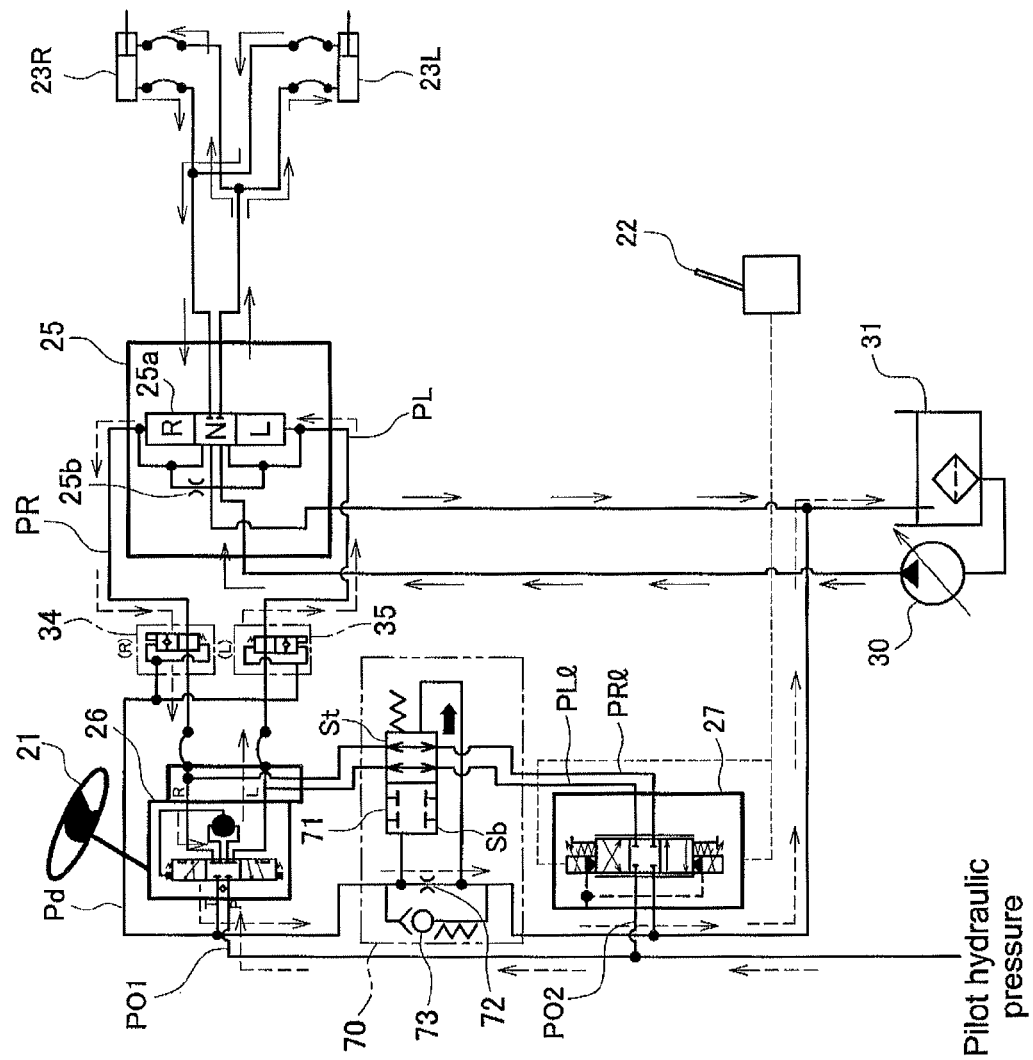
FIG. 12 describes a flow of operating fluid when a handle operation is conducted according to the fourth embodiment of the present invention.

FIG. 12 illustrates the flow of steering operating fluid (solid lines) and pilot operating fluid (dashed lines) when the handle is operated for a turn to the left.

When the handle 21 is operated, operating fluid is input from the first input oil passage P01 to the orbit roll 26. The operating fluid is input to the left pilot port of the directional control valve 25a of the steering valve 25 via the stop valve 35. The directional control valve 25a is switched to the left turning stage L due to the input of pilot hydraulic pressure.

At this time, the operating fluid in the right pilot oil passage PR is returned from the T port of the orbit roll 26 to the tank 31 via the drain oil passage Pd.

When the directional control valve 25a of the steering valve 25 is switched to the left turning stage L, operating fluid from the pump 30 is supplied to the bottom-side oil chamber of the left steering cylinder 23L and to the rod-side oil chamber of the right steering cylinder 23R via the steering valve 25.

The operating fluid inside the bottom-side oil chamber of the right steering cylinder 23R and inside the rod-side oil chamber of the left steering cylinder 23L is returned to the tank 31 via the steering valve 25.

As described above, operating fluid from the T port of the orbit roll 26 is returned to the tank 31 when the handle 21 is operated. The operating fluid passes through the throttle 72. As a result, the upstream (orbit roll 26 side) pressure of the throttle 72 is higher than the downstream (lever electromagnetic control valve 27 side) pressure. Therefore, the prioritization valve body 71 is switched to the shutoff stage Sb.

(Joystick 22 Operation)

Figure 13:
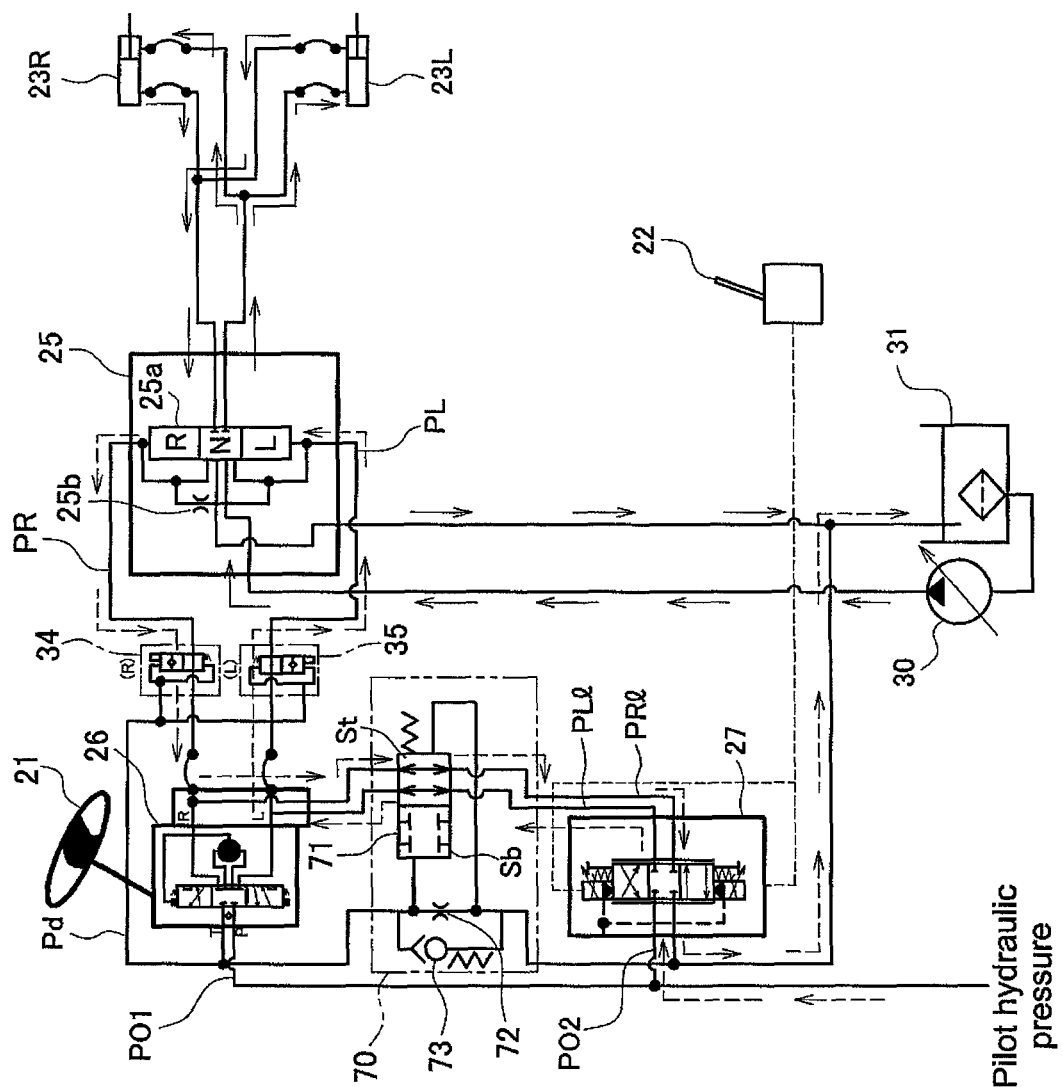
FIG. 13 describes a flow of operating fluid when a joystick operation is conducted according to the fourth embodiment of the present invention.

FIG. 13 illustrates a case in which only the joystick 22 is operated. When the handle 21 is not operated, operating fluid does not flow to the orbit roll 26. As a result, pilot hydraulic pressure is not supplied to the prioritization valve body 71. Therefore, the prioritization valve body 71 is switched to the communication stage St.

In the condition described above, operating fluid input from the second input oil passage P02 is output from the joystick 22 to the left lever pilot oil passage PL1. The operating fluid is supplied to the left pilot oil passage PL via the prioritization valve body 71 and, in the same way as described above for the handle operation, is input to the left pilot port of the directional control valve 25a of the steering valve 25. Therefore, the directional control valve 25a is switched to the left turning stage L. The pilot oil in the right pilot oil passage PR is returned from the drain T port of the lever electromagnetic control valve 27 to the tank 31 via the drain oil passage Pd.

The flow of the steering operating fluid is exactly the same as for the handle operation.

(When the Handle 21 and the Joystick 22 are Operated)

The joystick 22 may be operated when the operator mistakenly touches the joystick 22 while operating the handle 21. In this case, the handle operation is prioritized.

Specifically, when the handle 21 is operated, the operating fluid flows from the orbit roll 26 to the tank 31 and the pressure on the orbit roll 26 side of the throttle 72 becomes higher. As a result, pilot hydraulic pressure is supplied to the prioritization valve body 71 and the prioritization valve body 71 is switched to the shutoff stage Sb.

As described above, a handle operation is prioritized by shutting off the operating fluid flowing from the lever electromagnetic control valve 27 with the priority control valve 71 even if the joystick 22 is operated during a handle operation.

When the flow rate inside the drain oil passage Pd becomes large, the differential pressure on either side of the throttle 72 becomes larger than necessary and, as a result, high back pressure is developed in the drain passages. At this time, the check valve 73 is opened to prevent the occurrence of problems inside the circuit due to a large back pressure. Even if the throttle 72 becomes clogged, the check valve 73 is opened when the hydraulic pressure in the drain oil passage Pd is equal to or greater than a certain pressure. As a result, the orbit roll 26 is able to function as normal and the handle operation is enabled.

Effects of Fourth Embodiment

A handle operation is prioritized when the handle 21 is operated and an unintentional steering operation can be prevented in the same way as described above in the fourth embodiment. Actions are performed in a stable manner and the circuit configuration is simple.

Other Embodiments

The present invention is not limited to the above embodiments and various changes and modifications may be made without departing from the spirit of the invention.

INDUSTRIAL APPLICABILITY

According to the present invention, a mechanism for prioritizing a handle operation is achieved with a simple configuration and the actuation of the mechanism in a stable manner is realized in a wheel loader in which steering can be operated by a handle operation and a lever operation.

What is claimed is:

1. A steering device for a wheel loader in which a front frame and a rear frame are pivotably coupled in a horizontal direction, the steering device comprising:
   a handle operated by rotation for steering;
   a lever operated by tilting for steering;
   a steering cylinder configured to pivot the front frame in relation to the rear frame by expansion and contraction;
   a steering valve configured to control a supply direction of operating fluid to the steering cylinder with pilot hydraulic pressure;
   a pump configured to supply operating fluid to the steering cylinder via the steering valve;
   a handle control valve configured to supply pilot hydraulic pressure in order to control the supply direction to the steering valve according to a rotation operation of the handle;
   a lever electromagnetic control valve configured to supply pilot hydraulic pressure in order to control the supply direction to the steering valve according to a tilting operation of the lever; and
   a handle prioritization valve configured to shut off the pilot hydraulic pressure supplied from the lever electromagnetic control valve to the steering valve according to a differential pressure or an absolute pressure in a hydraulic circuit produced due to operating fluid flowing through the handle control valve when the handle is operated,
   the handle prioritization valve including:
      a first throttle provided in a circuit for supplying operating fluid to the handle control valve; and
      a prioritization valve body that has
         a communication stage configured to supply pilot hydraulic pressure from the lever electromagnetic control valve to the steering valve and
         a shutoff stage configured to shut off the supply of the pilot hydraulic pressure to the steering valve, and
      the prioritization valve body is switched to the shutoff stage when a differential pressure is produced on either side of the first throttle.

2. The steering device for the wheel loader according to claim 1, wherein
   the handle prioritization valve further includes a second throttle that has an aperture diameter smaller than an aperture of the first throttle, and
   the second throttle is provided in a circuit configured to supply operating fluid to the lever electromagnetic control valve.

3. The steering device for the wheel loader according to claim 1, further comprising:
   a check valve that is opened when the differential pressure on either side of the first throttle is equal to or greater than a certain pressure in order to supply operating fluid to the handle control valve, and
   the check valve stops operating fluid from flowing in reverse from the handle control valve.

\* \* \* \* \*